United States Patent [19]

McElroy

[11] 3,902,170
[45] Aug. 26, 1975

[54] FAULT INDICATOR FOR ELECTRICAL CIRCUITS
[76] Inventor: Ralph D. McElroy, 402 63rd St., 142, San Diego, Calif. 92114
[22] Filed: Feb. 20, 1974
[21] Appl. No.: 444,033

[52] U.S. Cl............. 340/373; 335/255; 340/378 R; 317/9 D
[51] Int. Cl.² .......................................... G08B 5/00
[58] Field of Search.......... 340/373, 378 R; 335/17, 335/234, 255; 137/556, 625.63; 251/129; 317/9 D

[56] References Cited
UNITED STATES PATENTS

| | | | |
|---|---|---|---|
| 2,841,779 | 7/1958 | Petterson | 340/378 R |
| 3,425,055 | 1/1969 | Pihl | 340/373 R |
| 3,465,333 | 9/1969 | Pihl | 340/373 R |
| 3,636,556 | 1/1972 | Pihl | 340/373 |
| 3,678,426 | 7/1972 | Pihl | 340/373 R |
| 3,733,570 | 5/1973 | Worrall | 335/255 |
| 3,774,199 | 11/1973 | Patterson | 340/373 R |

Primary Examiner—John W. Caldwell
Assistant Examiner—William M. Wannisky
Attorney, Agent, or Firm—Brown & Martin

[57] ABSTRACT

A device that propels a permanent magnet into a display position to provide a stable indication of a transitory malfunction as detected from an opening of an electrical circuit. The permanent magnet is propelled by a DC coil which receives rectified DC voltage from a bridge, full-wave, rectifier in series with a resistor. The device is placed across the interlock safety switch of a sensed malfunction circuit so that when the switch opens the magnet is propelled into its display position providing an indication of the particular circuit in which the malfunction took place. The magnet may be returned to its initial position by a hand held permanent magnet.

7 Claims, 4 Drawing Figures

PATENTED AUG 26 1975　　　　　　　　　　　　　　　　　　3,902,170

FAULT INDICATOR FOR ELECTRICAL CIRCUITS

BACKGROUND OF THE INVENTION

In heavy electrical machinery such as an electric motor driven heavy duty pump there are frequently provided sensing devices which have the capability of shutting down the machinery in the case of a malfunction. Typical malfunctions provided for would be the onset of bearing failure as indicated by a temperature sensor, excessive pressure drop across the pump, high current flow to the winding of the electric motor, and other similar sensors. These sensors are normally connected to relays and interlock switches which can open the primary power circuit to the machinery. Thus, excessive bearing temperature, for example, causes the machinery to be shut down, however by the time maintenance personnel have reached the device the bearing may have cooled and therefore there is no reliable Indication of which portion of the device was malfunctioning and therefore caused shut down of the apparatus.

Because of the foregoing detection and indication problem, various devices have been proposed which would provide a stable indication of which sensing circuit opened causing the shut down of the apparatus. In such prior art devices it has been necessary to provide mechanical access to the device to reset the indication after the occurrence of a malfunction. Since these devices frequently operate in severe environments involving dirt and other foreign material as well as corrosive gases, the device may become inoperative due to these materials and therefore fail to provide a reliable indication of the malfunctioning circuit. Additionally, some prior art devices have required an independent source of power, and thus were more expensive to utilize and wire, and were dependent upon the integrity of the independent power source.

In devices powered from the sensing circuit, however, no practical device has been provided. The contactor coils on the circuit relays have a high impedance relative to the impedance of most proposed indicating devices therefore sufficient line voltage exists across the contactor coil to hold the relay closed. It has generally been assumed that there is no practical solution to this problem.

Therefore, it is desirable to have a fault indicator for electrical circuits that is hermetically sealed against deleterious gases and foreign material and which presents a relatively high impedance to the external circuit. Such a device particularly is desirable when it is adaptable to mounting in the same hardware as is used in the wiring for the machinery and where the device is relatively low in manufacturing cost.

SUMMARY OF THE INVENTION

An exemplary embodiment of the invention incorporates a device housed in an indicator body. The indicator body is generally cylindrical in configuration and has a transparent viewing window at one end. The other end of the body includes a standard pipe threaded connection for installing the device into the mounting holes of standard electrical conduit. The indicator body mounts a magnet coil having a relatively large number of turns to produce a high ampere turns rating, with relatively low current levels. The coil is connected across a bridge rectifier which makes the rectifier less sensitive to damage from voltage transients and delivers fullwave rectified DC to the coil. The indicator body also houses a high impedance resistor in series with the rectifier and DC coil for purposes which will be described more fully hereinafter. The magnetic coil is mounted with its axis generally parallel to the cylindrical body. Coaxially with the magnetic coil there is provided a channel which receives the pole piece. In the instant embodiment the pole piece is a permanent magnet arranged so that it will be repelled from the magnetic coil when the coil is energized. The magnet is appropriately marked so that when it is propelled by energization of the magnetic coil into the transparent end of the device it will be highly visable. The magnet is kept spaced from the pole piece by a plug of non-magnetic material.

In the usual installation the device is installed in the electrical conduit and arranged with its axis horizontal. The two leads of the device are connected across the interlock switch of the sensing malfunction circuit to be monitored. When the switch is closed no voltage is delivered to the device and the magnet remains in its first position adjacent the magnetic coil. When a malfunction occurs the interlock switch opens delivering line voltage across the device thus producing rectified DC across the coil. This causes the coil to repel the magnet into the viewing port where it remains despite subsequent closing of the interlock switch. In the usual installation the device is wired in the contactor coil circuit of the interlock switch and therefore the relative impedance of the device must be kept high as compared with the impedance of the contactor coil. If the relative impedance of the device is low as compared to the contactor coil, then sufficient current would flow through the device to keep the contactor coil energized. Therefore, it may be necessary to lower the effective impedance of the contactor coil as compared with the device by providing a shunt resistor across the contactor coil. The device will function as described so long as the contactor coil sees no more than approximately 30% of the usual line voltage with the interlock switch open. This results in a requirement of a ratio of impedance between the indicator device and the contactor coil-shunt resistor combination be two to one.

Whereas the use of a DC coil with a permanent magnet pole piece has special advantages in the invention, it should be noted that it is possible to use an AC coil with a soft iron pole piece. A soft iron pole piece may be returned to its initial position by providing a flexible viewing port or by physically turning the device from the horizontal to the vertical.

It is therefore an object of the invention to provide a new and improved fault indicator for electrical circuits.

It is another object of the invention to provide a new and improved fault indicator that is hermetically sealed.

It is another object of the invention to provide a new and improved fault indicator that requires relatively few component parts.

It is another object of the invention to provide a new and improved fault indicator that is adaptable to existing electrical mounting provisions.

It is another object of the invention to provide a new and improved fault indicator that is powered from the sensing circuit voltage.

It is another object of the invention to provide a new and improved fault indicator that has only one moving part.

It is another object of the invention to provide a new and improved fault indicator that is not susceptible to voltage transient damage.

It is another object of the invention to provide a new and improved fault indicator that is highly reliable.

Other objects and many attendant advantages of the invention will become more apparent upon a reading of the following detailed description, together with the drawings, in which like reference numerals refer to like parts throughout and in which.

Figure 1:
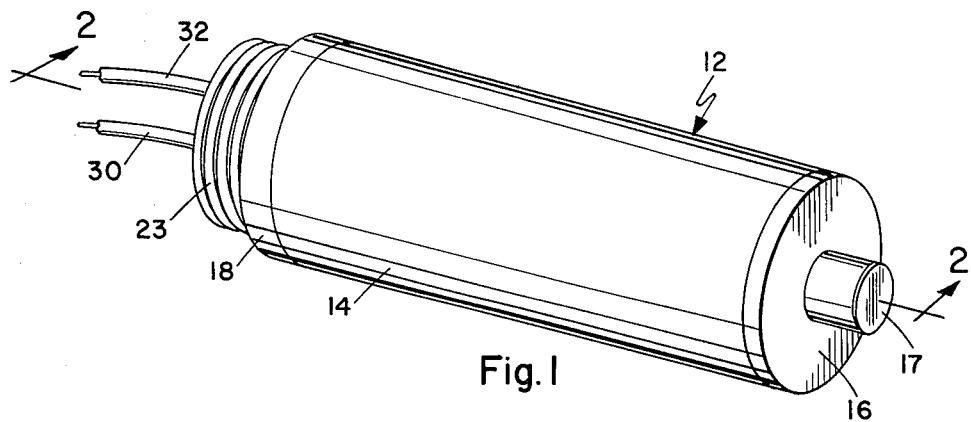
FIG. 1 is a perspective view of the fault indicator.
Figure 2:
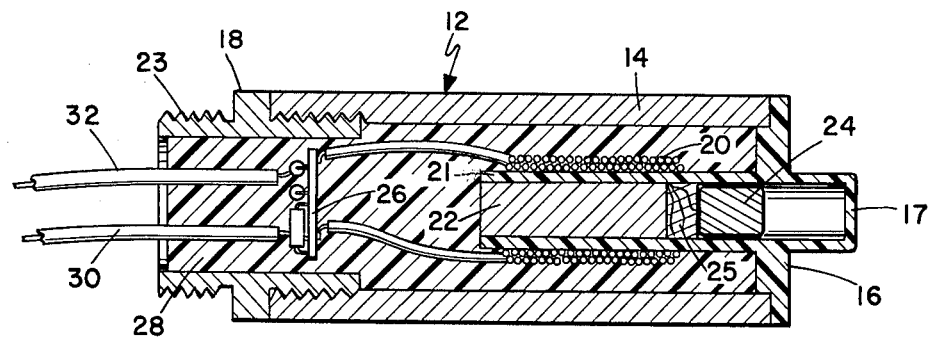
FIG. 2 is a sectional view taken on line 2—2 of FIG. 1.
Figure 3:
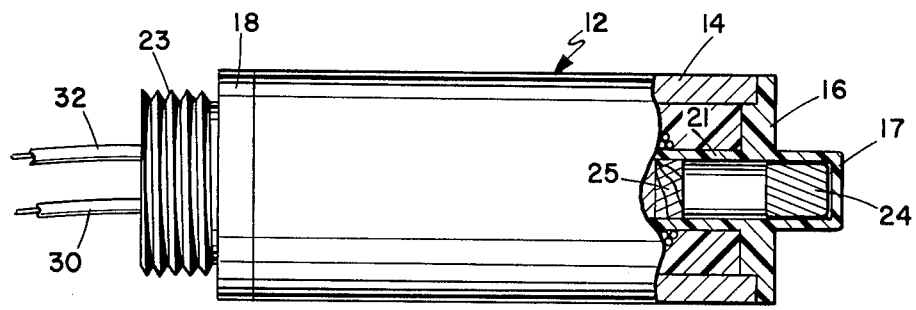
FIG. 3 is a side elevation view, partially cut away, with the magnet in the display position.

Referring now to the drawing there is illustrated in FIGS. 1 and 2 the fault indicator according to the invention. The device is shown to be housed in an indicator body 12 which comprises a generally cylindrical barrel portion 14, a transparent viewing port display end 16 and a sealing and connecting end 18. The indicator body 12 mounts a magnetic coil 20 which is wound around a coil form 21 containing a soft iron core 22 and terminated in a non-magnetic plug 25. An extension of the coil form 21 provides a channel for the magnet 24 so that the magnet may translate between a first position illustrated in FIG. 2 wherein it is in contact with the plug 25 of the coil 20, to a second or display position wherein it is visable through the transparent viewing port 17 as is illustrated in FIG. 3.

The sealing and connecting end 18 hermetically seals the interior of the indicator body and also pots the electrical component circuits 26 in potting material 28. Connecting wires 30 and 32 pass through the potting material for connection to the external circuit. The sealing and connecting end 18 mounts threads 23 which are of the standard pipe thread type for connection of the device into a hole in standard electrical conduit.

Figure 4:
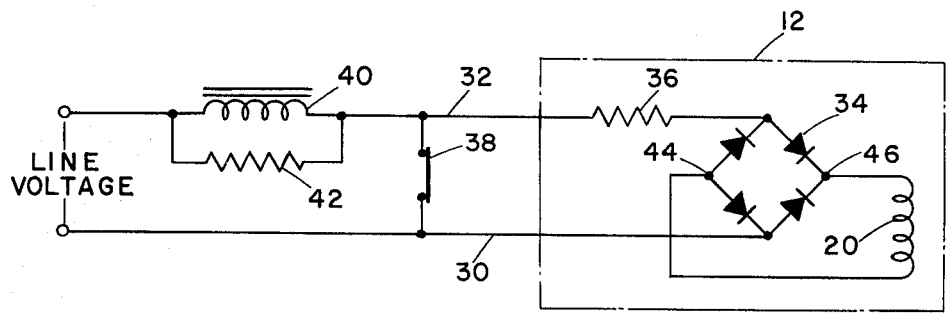
FIG. 4 is a wiring diagram of the fault indicator connected in an operative circuit.

Referring now to FIG. 4, the schematic wiring diagram of the indicator device, as connected to an external sensing circuit, il illustrated. The magnet coil 20 is connected to terminals 44 and 46 of the full-wave, bridge-type, rectifier 34. Thus the coil 20 received full-wave rectified DC and thereby has a constant polarity for repelling the magnet 24. The rectifier is in series with the resistor 36 which is of a relatively high impedance. The leads 30 and 32 are connected across the relay contacts 38. The opening of the relay contacts 38 in response to a malfunction of one of the machinery components causes a loss of current to the contactor coil 40 thereby opening the primary power source and bringing the machinery to a stop. A shunt resistor 42 is provided as required to make the total impedance of the indicator at least twice that of the contact coil and shunt resistor combination.

OPERATION

In use, the device is installed on an electrical circuit panel or directly in electrical conduit, and one such device is associated with each malfunction sensing circuit. When an electrical malfunction, such as over heating of a bearing, occurs the sensing circuit opens the appropriate contacts 38 which causes a portion of the line voltage normally across the contactor coil to be delivered across the fault indicator device. The series resistor 36 is of sufficient value that relatively little current can flow through the contactor coil 40 as the contacts 38 open. Thus, insufficient current is available through the coil 40 to hold the relay closed. With voltage across the open contacts of interlock switch 38, the rectifier 34 delivers DC voltage to the terminals 44 and 46 thereby energizing the magnetic coil 20. This energization produces a DC magnetization of the coil which repels the magnet 24 into the display position as is illustrated in FIG. 3. Since the machinery is shut down the overheated bearing will eventually cool down, causing the sensing circuit to return the contacts 38 to the closed position. However, since the magnet has been propelled into the indicated position, it will remain in position to indicate to the maintenance personnel the particular sensing circuit which caused the tripping of the device. Maintenance personnel upon reaching the scene and after determining the appropriate malfunction that needs repair will cause the magnet 24 to be returned to the first position orienting a hand held magnet so that the pole with the opposite polarity to the outermost pole of magnet 24 is brought into immediate proximity of the magnet 24 causing it to be repelled into the first position as is illustrated in FIG. 2.

Having described my invention, I now claim:

1. A device for displaying an indication of a sensed malfunction as detected from at least a momentary opening of an electrical circuit wherein the improvement comprises:

an indicator body, a DC magnet coil in said body, a permanent magnet pole piece of magnetic materials carried within said body, guide means within said body for guiding said pole piece in translational movement between a first position in proximity to said coil and a second indicating position spaced from said coil, viewing port means for displaying said pole piece in said second position.

2. The device according to claim 1, wherein:

the translation of said pole piece is along a line parallel to the axis of said coil.

3. The device according to claim 1, wherein:

said full wave rectifier is a bridge-type rectifier.

4. The device according to claim 1, wherein:

said indicator body houses said coil and said pole piece, said indicator body being hermetically sealed.

5. The device according to claim 1, wherein:

said indicator body is cylindrical and has a transparent display end housing said pole piece, said pole piece being supported between said first and second positions in a channel within said body.

6. The device according to claim 1, wherein:

said pole piece is held in said first position by magnetic attraction.

7. The device according to claim 1, further comprising:

a full-wave rectifier in series with said coils.

* * * * *